(12) United States Patent
Lim et al.

(10) Patent No.: US 9,489,008 B2
(45) Date of Patent: Nov. 8, 2016

(54) METHOD AND APPARATUS FOR CLOCK FREQUENCY RATIO INDEPENDENT ERROR LOGGING

(75) Inventors: Ming Yi Lim, Ayer Itam (MY); Su Wei Lim, Klang (MY); Poh Thiam Teoh, Kuala Lumpur (MY)

(73) Assignee: Intel Corporation, Santa Clara, CA (US)

( * ) Notice: Subject to any disclaimer, the term of this patent is extended or adjusted under 35 U.S.C. 154(b) by 631 days.

(21) Appl. No.: 13/976,933

(22) PCT Filed: Dec. 22, 2011

(86) PCT No.: PCT/US2011/066892
§ 371 (c)(1),
(2), (4) Date: Jun. 27, 2013

(87) PCT Pub. No.: WO2013/095519
PCT Pub. Date: Jun. 27, 2013

(65) Prior Publication Data
US 2013/0283084 A1 Oct. 24, 2013

(51) Int. Cl.
*G11C 29/00* (2006.01)
*G06F 1/10* (2006.01)
*G06F 13/00* (2006.01)
*G06F 11/08* (2006.01)
*G06F 11/10* (2006.01)

(52) U.S. Cl.
CPC ............... *G06F 1/10* (2013.01); *G06F 11/08* (2013.01); *G06F 11/1004* (2013.01); *G06F 13/00* (2013.01)

(58) Field of Classification Search
CPC ...... G06F 1/10; G06F 11/08; G06F 11/1004; G06F 11/30; G06F 11/3027; G06F 13/00; G06F 13/24; G06F 13/423; G11B 20/18; G11B 20/1883; G11C 29/44; G11C 29/56; H04L 12/56
See application file for complete search history.

(56) References Cited

U.S. PATENT DOCUMENTS

| | | | | |
|---|---|---|---|---|
| 7,444,558 B2 * | 10/2008 | Mitbander | ............ | G06F 11/221 375/221 |
| 7,805,638 B2 * | 9/2010 | Jones | ................... | G06F 11/362 713/400 |
| 2007/0011548 A1 * | 1/2007 | Chemudupati | ..... | G06F 11/0745 714/746 |
| 2007/0112996 A1 * | 5/2007 | Manula | ................. | G06F 13/423 710/310 |
| 2009/0106636 A1 * | 4/2009 | Jenkins | ................ | H04L 1/0041 714/804 |

(Continued)

OTHER PUBLICATIONS

International Search Report and Written Opinion for PCT Patent Application No. PCT/US2011/066892, Mailed Sep. 19, 2012, 9 Pages.
International Preliminary Report on Patentability for PCT Patent Application No. PCT/US2011/066892, mailed Jul. 3, 2014, 6 pages.

*Primary Examiner* — Albert DeCady
*Assistant Examiner* — Enamul M Kabir
(74) *Attorney, Agent, or Firm* — Blakely, Sokoloff, Taylor & Zafman LLP

(57) ABSTRACT

A method and system for error logging that is independent of the clock frequency ratio in an I/O subsystem. In one embodiment of the invention, the I/O subsystem has an error logging mechanism with a fixed queue depth of two and is independent of the clock frequencies in the I/O subsystem. The I/O subsystem has two queue entries for storing or logging the uncorrectable errors. In one embodiment of the invention, the I/O subsystem has two queue entries for storing or logging the 128-bit TLP Header and the First Error Pointer (FEP) of the uncorrectable errors detected in the I/O subsystem.

14 Claims, 4 Drawing Sheets

(56) References Cited

U.S. PATENT DOCUMENTS

| | | | |
|---|---|---|---|
| 2009/0292960 A1* | 11/2009 | Haraden | G06F 11/0745 714/699 |
| 2010/0251055 A1* | 9/2010 | Murakami | G06F 13/4282 714/748 |
| 2011/0153906 A1 | 6/2011 | Suzuki et al. | |
| 2011/0296256 A1* | 12/2011 | Watkins | G06F 11/0745 714/54 |
| 2012/0079312 A1* | 3/2012 | Muthrasanallur | G06F 11/0793 714/5.1 |
| 2012/0221764 A1* | 8/2012 | Glass | G06F 13/36 710/314 |
| 2013/0159764 A1* | 6/2013 | Adar | G06F 11/0793 714/5.1 |

* cited by examiner

METHOD AND APPARATUS FOR CLOCK FREQUENCY RATIO INDEPENDENT ERROR LOGGING

CLAIM OF PRIORITY

This application is a U.S. National Phase application under 35 U.S.C. §371 of International Application No. PCT/US2011/066892, filed Dec. 22, 2011, entitled "METHOD AND APPARATUS FOR CLOCK FREQUENCY RATIO INDEPENDENT ERROR LOGGING," the entire contents of which are incorporated herein by reference.

Applicants respectfully submit that no new matter has been entered, and the amendments correct and clarify the previously submitted claim of priority.

FIELD OF THE INVENTION

This invention relates to an Input/Output (I/O) subsystem, and more specifically but not exclusively, to a method and apparatus for error logging that is independent of the clock frequency ratio in the I/O subsystem.

BACKGROUND DESCRIPTION

The Peripheral Component Interconnect Express specification requires uncorrectable error(s) received by an endpoint device to be logged in a configuration register. This allows the software on the endpoint device to read the configuration register to detect the type of the uncorrectable error(s). When the endpoint device supports Advanced Error Reporting, it records the erroneous 128-bit Transaction Layer Packet header and its corresponding First Error Pointer.

BRIEF DESCRIPTION OF THE DRAWINGS

The features and advantages of embodiments of the invention will become apparent from the following detailed description of the subject matter in which.

DETAILED DESCRIPTION

Figure 1:
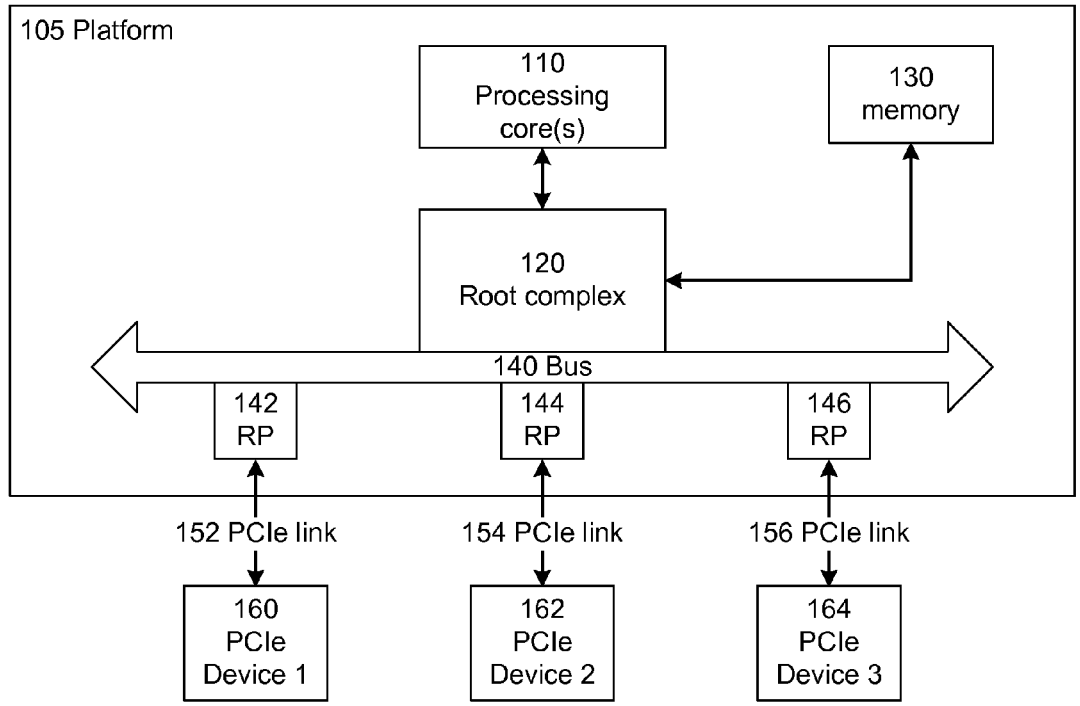
FIG. 1 illustrates a block diagram of an I/O subsystem in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

The terms "upstream" and "downstream" are used to illustrate the direction of the traffic or data flow in the platform in one embodiment of the invention and are not meant to be limiting. The terms "upstream" and "downstream" may be interchanged in another embodiment of the invention. Other terminology to describe the direction of the traffic or data flow in the platform can be used without affecting the workings of the invention.

Embodiments of the invention provide a method for error logging that is independent of the clock frequency ratio in the I/O subsystem. In one embodiment of the invention, the I/O subsystem has an error logging mechanism with a fixed queue depth of two and is independent of the clock frequencies or clock frequency ratio in the I/O subsystem. The I/O subsystem has two queue entries for storing or logging the uncorrectable errors in one embodiment of the invention. For example, in one embodiment of the invention, the I/O subsystem has two queue entries for storing or logging the 128-bit Transaction Layer Packet (TLP) Header and the First Error Pointer (FEP) of the uncorrectable errors detected in the I/O subsystem.

For example, in one embodiment of the invention, the I/O subsystem has logic to store, based on a source clock domain in a first time frame, a header of a first erroneous TLP and a FEP associated with the first erroneous TLP. The logic copies, based on the source clock domain in a second time frame, the header of the first erroneous TLP and the FEP associated with the first erroneous TLP and clock-crosses the header of the first erroneous TLP and the FEP associated with the first erroneous TLP from the source clock domain to a destination clock domain in the second time frame. After the clock-crossing, the logic stores, based on the destination clock domain in the second time frame, the header of the first erroneous TLP and the FEP associated with the first erroneous TLP.

By having two queue entries for storing or logging the 128-bit TLP Header and the FEP of the uncorrectable errors detected in the I/O subsystem, it allows the I/O subsystem to provide an error logging mechanism that is independent of the clock frequency ratio in the I/O subsystem.

In one embodiment of the invention, the I/O subsystem is compliant at least in part with the Peripheral Component Interconnect Express (PCIe) standard or specification maintained by the PCI Special Interest Group (PCI-SIG). For example, in one embodiment of the invention, the I/O subsystem is compliant at least in part with, but not limited to, the PCIe base specification revision 2.0, the PCIe base specification revision 3.0 and future releases of the PCIe base specification. One of ordinary skill in the relevant art will readily appreciate that the I/O subsystem may be compliant with other wired or wireless communication protocols without affecting the workings of the invention.

For example, in one embodiment of the invention, the I/O subsystem is a Platform Control Hub or subsystem that has an upstream Direct Memory Interface (DMI) port and multiple downstream PCI Express root ports. In one embodiment of the invention, the I/O subsystem supports the Advanced Error Reporting (AER) defined in the PCIe base specification or standard.

FIG. 1 illustrates a block diagram 100 of a platform 105 that has an I/O subsystem in accordance with one embodiment of the invention. In one embodiment of the invention, the platform 105 has a processing core(s) 110 coupled to a Root Complex 120. The Root Complex 120 is coupled with a bus 140 and a memory 130 and supports three Root Ports (RP) 142, 144 and 146. The Root Ports 142, 144 and 146 are coupled with the PCIe endpoint devices 1-3 160, 162 and 164 respectively via the PCIe communication links 152, 154, and 156. In one embodiment of the invention, each of the Root Ports 142, 144 and 146 has an upstream port that is coupled with the respective downstream port of the PCIe endpoint devices 1-3 160, 162 and 164.

In one embodiment of the invention, the Root Complex 120 generates transaction requests on behalf of the processor core(s) 110. In one embodiment of the invention, the Root Complex 120 is integrated with the processing core 120. In another embodiment of the invention, the Root Complex 120 supports more than three Root Ports. In yet another embodiment of the invention, the Root Complex 120 supports less than three Root Ports.

In one embodiment of the invention, each of the Root Ports 142, 144 and 146 and their respective PCIe endpoint devices 1-3 160, 162 and 164 support clock frequency ratio independent error logging. FIG. 1 is not meant to be limiting and serves only as one embodiment of the invention that is compliant at least in part with the PCIe standard. One of ordinary skill in the relevant art will readily appreciate how to adapt the workings of the invention to other high speed serial communication protocols and shall not be described herein.

Figure 2:
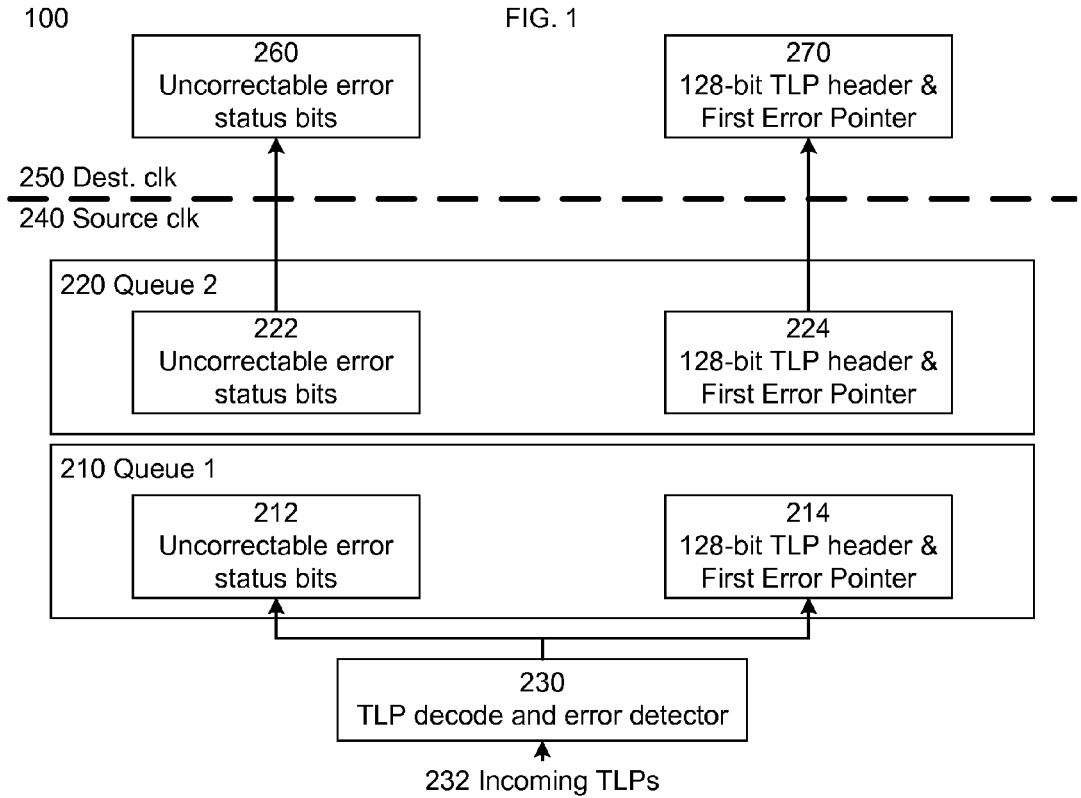
FIG. 2 illustrates a block diagram of the clock crossing in the I/O subsystem in accordance with one embodiment of the invention.

FIG. 2 illustrates a block diagram of the clock crossing in the I/O subsystem in accordance with one embodiment of the invention. For clarity of illustration, FIG. 2 is discussed with reference to FIG. 1 and the I/O subsystem is assumed to be compliant at least in part with the PCIe standard and supports AER. For example, in one embodiment of the invention, in each of the Root Ports 142, 144 and 146, it has an error handling logic that includes, but is not limited to, the TLP decode and error detector 230, the queue 1 210 and the queue 2 220.

The error handling logic facilitates the error logging mechanism across the source clock (clk) 240 domain to the destination clock 250 domain in one embodiment of the invention. For example, in one embodiment of the invention, the Root Port 142 receives incoming TLPs 232 from the PCIe device 1 160 via the PCIe communication link 152. The incoming TLPs 232 are processed by the TLP decode and error detector 230 to decode the incoming TLPs 232 and detect any uncorrectable errors in one embodiment of the invention.

The source clock 240 domain represents the clock domain of the reception and processing of the incoming TLPs 232 in one embodiment of the invention. The destination clock 250 domain represents the clock domain of the configuration register (not shown in FIG. 2) that stores the uncorrectable error stats bits 260 and the 128-bit TLP header and FEP 270 in one embodiment of the invention. The source clock 240 domain and the destination clock 250 domain can have any clock ratio in one embodiment of the invention.

The error handling logic uses the queues 1 210 and 2 220 to isolate the uncorrectable errors accumulated in different time frames in one embodiment of the invention. In one embodiment of the invention, the time frame is set at a suitable time interval that allows the reception of at least one TLP. For example, in one embodiment of the invention, in each time frame, the TLP decode and error detector 230 stores or logs the header of the first erroneous received TLP and its associated FEP in the queue 1 210. For example, in one embodiment of the invention, the error handling logic sets the uncorrectable error status bits 212 for the first erroneous received TLP and stores the 128-bit TLP header and the FEP of the first erroneous received TLP 214.

The error handling logic continues to log or store the errors for subsequent erroneous TLPs but without logging or storing their header and FEP in one embodiment of the invention. When the queue 2 220 Q2 is empty, the values of the queue 1 210 is copied or propagated to the queue 2 220. For example, the error handling logic copies or propagates the uncorrectable error status bits 212 for the first erroneous received TLP and the 128-bit TLP header and the FEP of the first erroneous received TLP 214 in the queue 1 210 as the uncorrectable error status bits 222 for the first erroneous received TLP and the 128-bit TLP header and the FEP of the first erroneous received TLP 224 in the queue 2 220.

At this instance, the queue 1 210 begin a new time frame. In the new time frame, the error handling logic clock-crosses the stored values in the queue 2 220 from the source clock domain 240 to the destination clock domain 250 and update the stored values in the configuration register. For example, in one embodiment of the invention, the error handling logic clock-crosses the uncorrectable error status bits 222 for the first erroneous received TLP and the 128-bit TLP header and the FEP of the first erroneous received TLP 224 in the queue 2 220 and sends the clock-crossed uncorrectable error status bits 260 for the first erroneous received TLP and the clock-crossed 128-bit TLP header and the FEP of the first erroneous received TLP 270 for updating the configuration register.

The error handling logic allows the error logging information to be accumulated in the queue 1 210 while waiting for the clock crossing to be completed. Once the clock crossing has completed, the queue 2 220 is released. The workings for the error handling logic in Root Port 1 142 applies to the Root Ports 144 and 146 and shall not be described herein.

Figure 3:
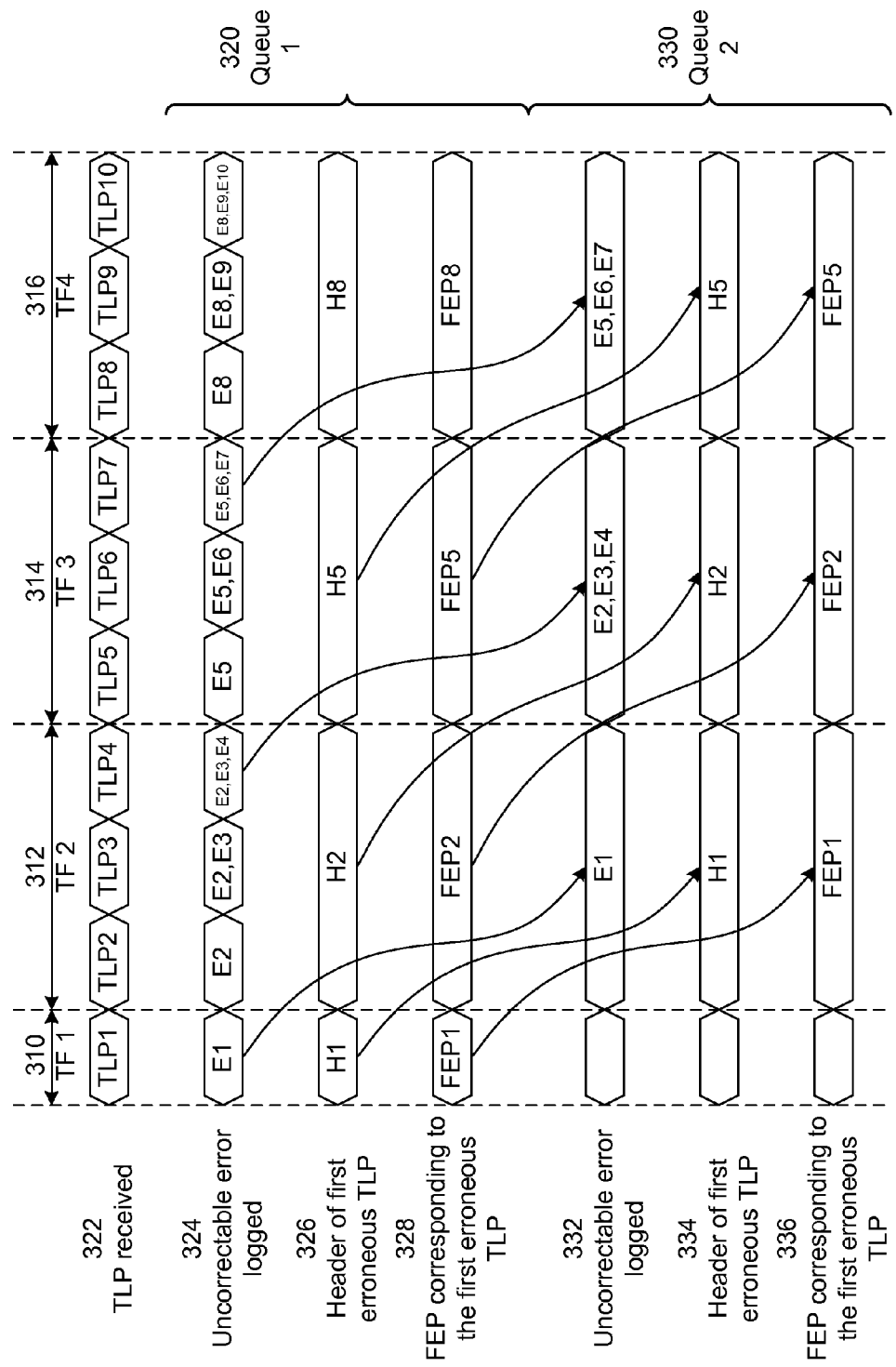
FIG. 3 illustrates a timing diagram of the I/O subsystem in accordance with one embodiment of the invention.

FIG. 3 illustrates a timing diagram 300 of the I/O subsystem in accordance with one embodiment of the invention. For clarity of illustration, FIG. 3 is discussed with FIGS. 1 and 2. The timing diagram 300 illustrates four time frames (TF) 1 310, TF 2 312, TF 3 314, and TF 4 316. The TLP received timing flow 322 shows the TLP(s) received in each of the TF 1 310, TF 2 312, TF 3 314, and TF 4 316. The queue 1 320 is assumed to operate in a source clock domain that is different from the destination clock domain of the configuration register that supports AER in one embodiment of the invention.

The uncorrectable error logged timing flows 324 and 332 illustrate the uncorrectable error(s) that are logged or recorded in each time frame for the queue 1 320 and the queue 2 330 respectively. The header of the first erroneous TLP timing flows 326 and 334 illustrate the header of the first error that is stored in each time frame for the queues 1 320 and 2 330 respectively. The FEP corresponding to the first erroneous TLP timing flows 328 and 336 illustrate the FEP corresponding to the first erroneous TLP that is stored in each time frame for the queues 1 320 and 2 330 respectively.

In time frame 1 310, the TLP decode and error detector 230 receives the incoming TLPs 232 and detects for any uncorrectable error in the incoming TLPs 232. The TLP1 in time frame 1 310 illustrates the first TLP that has an uncorrectable error detected by the TLP decode and error detector 230. The error handling logic stores or logs the uncorrectable error E1 of the TLP1 in one embodiment of the invention. For example, the error handling logic stores or logs the type of the uncorrectable error E1 in the TLP1.

The type or indication of the uncorrectable error includes, but is not limited to, a data link protocol error status, a surprise down error status, a poisoned TLP status, a flow control protocol error status, a completion timeout status, a completer abort status, an unexpected completion status, a receiver overflow status, a malformed TLP status, an Extended Cyclic Redundancy Check (ECRC) error status, an unsupported request error status, an Access Control Services (ACS) violation status, an uncorrectable internal error status, a Multicast (MC) blocked TLP status, an Atomic Operations (AtomicOp) Egress blocked status, and a TLP prefix blocked error status.

The error handling logic also stores or logs the header H1 of the TLP1 and the FEP1 corresponding to the TLP1 in the queue 1 320. In time frame 1 310, the queue 2 330 is empty.

In time frame 2 312, the TLP decode and error detector 230 continues to receive the incoming TLPs 232 and detects for any uncorrectable error in the incoming TLPs 232. The TLP2, TLP3 and TLP4 in time frame 2 312 illustrate the TLPs that have an uncorrectable error detected by the TLP decode and error detector 230. The error handling logic stores or logs the uncorrectable errors E2, E3 and E4 associated with the TLP2, TLP3 and TLP4 respectively in one embodiment of the invention. The error handling logic stores or logs the header H2 of the TLP2 and the FEP2 corresponding to the TLP2 in the queue 1 320.

In time frame 2 312, while the TLP decode and error detector 230 is receiving the incoming TLPs 232 and detecting for any uncorrectable error in the incoming TLPs 232, the error handling logic copies or propagates the information in the queue 1 320 to the queue 2 330 using the source clock domain. For example, in one embodiment of the invention, the error handling logic copies or propagates the stored uncorrectable error E1 of the TLP1 from the queue 1 320 to the uncorrectable error E1 of the queue 2 330 in time frame 2 312. Similarly, the error handling logic copies or propagates the stored header H1 of the TLP1 and the FEP1 corresponding to the TLP1 from the queue 1 320 to the header H1 of the TLP1 and the FEP1 corresponding to the TLP1 respectively of the queue 2 330 in time frame 2 312.

The error handling logic clock-crosses the copied uncorrectable error E1, the copied header H1 of the TLP1 and the copied FEP1 corresponding to the TLP1 in the queue 2 330 from the source clock domain to the destination clock domain in one embodiment of the invention. When the clock-crossing is complete, the clock-crossed uncorrectable error E1, the clock-crossed header H1 of the TLP1 and the clock-crossed FEP1 corresponding to the TLP1 are copied to the configuration register that supports the AER. By having the two queues 320 and 330, the clock crossing of the error information is performed with a depth of two and is independent of the clock ratio of the source clock domain and the destination clock domain in one embodiment of the invention.

In time frame 3 314, the TLP decode and error detector 230 continues to receive the incoming TLPs 232 and detects for any uncorrectable error in the incoming TLPs 232. The TLP5, TLP6 and TLP7 in time frame 3 314 illustrate the TLPs that have an uncorrectable error detected by the TLP decode and error detector 230. The error handling logic stores or logs the uncorrectable errors E5, E6 and E7 associated with the TLP5, TLP6 and TLP7 respectively in one embodiment of the invention. The error handling logic stores or logs the header H5 of the TLP5 and the FEP5 corresponding to the TLP5 in the queue 1 320.

In time frame 3 314, while the TLP decode and error detector 230 is receiving the incoming TLPs 232 and detecting for any uncorrectable error in the incoming TLPs 232, the error handling logic copies or propagates the information in the queue 1 320 to the queue 2 330 using the source clock domain. For example, in one embodiment of the invention, the error handling logic copies or propagates the stored uncorrectable errors E2, E3 and E4 of the TLP2, TLP3 and TLP4 from the queue 1 320 to the uncorrectable errors E2, E3 and E4 of the queue 2 330 in time frame 3 314. Similarly, the error handling logic copies or propagates the stored header H2 of the TLP2 and the FEP2 corresponding to the TLP2 from the queue 1 320 to the header H2 of the TLP2 and the FEP2 corresponding to the TLP2 respectively of the queue 2 330 in time frame 2 314.

The error handling logic clock-crosses the copied uncorrectable errors E2, E3 and E4, the copied header H2 of the TLP2 and the copied FEP2 corresponding to the TLP2 in the queue 2 330 from the source clock domain to the destination clock domain in one embodiment of the invention. When the clock-crossing is complete, the clock-crossed uncorrectable errors E2, E3 and E4, the clock-crossed header H2 of the TLP2 and the clock-crossed FEP2 corresponding to the TLP2 is copied to the configuration register that supports the AER.

In time frame 4 316, the TLP decode and error detector 230 continues to receive the incoming TLPs 232 and detects for any uncorrectable error in the incoming TLPs 232. The TLP8, TLP9 and TLP10 in time frame 4 316 illustrate the TLPs that have an uncorrectable error detected by the TLP decode and error detector 230. The error handling logic stores or logs the uncorrectable errors E8, E9 and E10 associated with the TLP8, TLP9 and TLP10 respectively in one embodiment of the invention. The error handling logic stores or logs the header H8 of the TLP8 and the FEP8 corresponding to the TLP8 in the queue 1 320.

In time frame 4 316, while the TLP decode and error detector 230 is receiving the incoming TLPs 232 and detecting for any uncorrectable error in the incoming TLPs 232, the error handling logic copies or propagates the information in the queue 1 320 to the queue 2 330. For example, in one embodiment of the invention, the error handling logic copies or propagates the stored uncorrectable errors E5, E6, and E7 of the TLP5, TLP6 and TLP7 respectively from the queue 1 320 to the uncorrectable error E1 of the queue 2 330 in time frame 4 316. Similarly, the error handling logic copies or propagates the stored header H5 of the TLP5 and the FEP5 corresponding to the TLP5 from the queue 1 320 to the header H5 of the TLP5 and the FEP5 corresponding to the TLP5 respectively of the queue 2 330 in time frame 4 316.

The error handling logic clock-crosses the copied uncorrectable errors E5, E6, and E7, the copied header H5 of the TLP5 and the copied FEP5 corresponding to the TLP5 in the queue 2 330 from the source clock domain to the destination clock domain in one embodiment of the invention. When the clock-crossing is complete, the clock-crossed uncorrectable errors E5, E6, and E7, the clock-crossed header H5 of the TLP5 and the clock-crossed FEP5 corresponding to the TLP5 is copied to the configuration register that supports the AER.

The subsequent time frames are not shown for clarity of illustration. The timing diagram 300 is not meant to be limiting and serves as one scenario that illustrates the workings of the invention. The time frames is not limited to detecting three erroneous TLPs and can be adjusted to detect a different number of erroneous TLPs in one embodiment of the invention.

Figure 4:
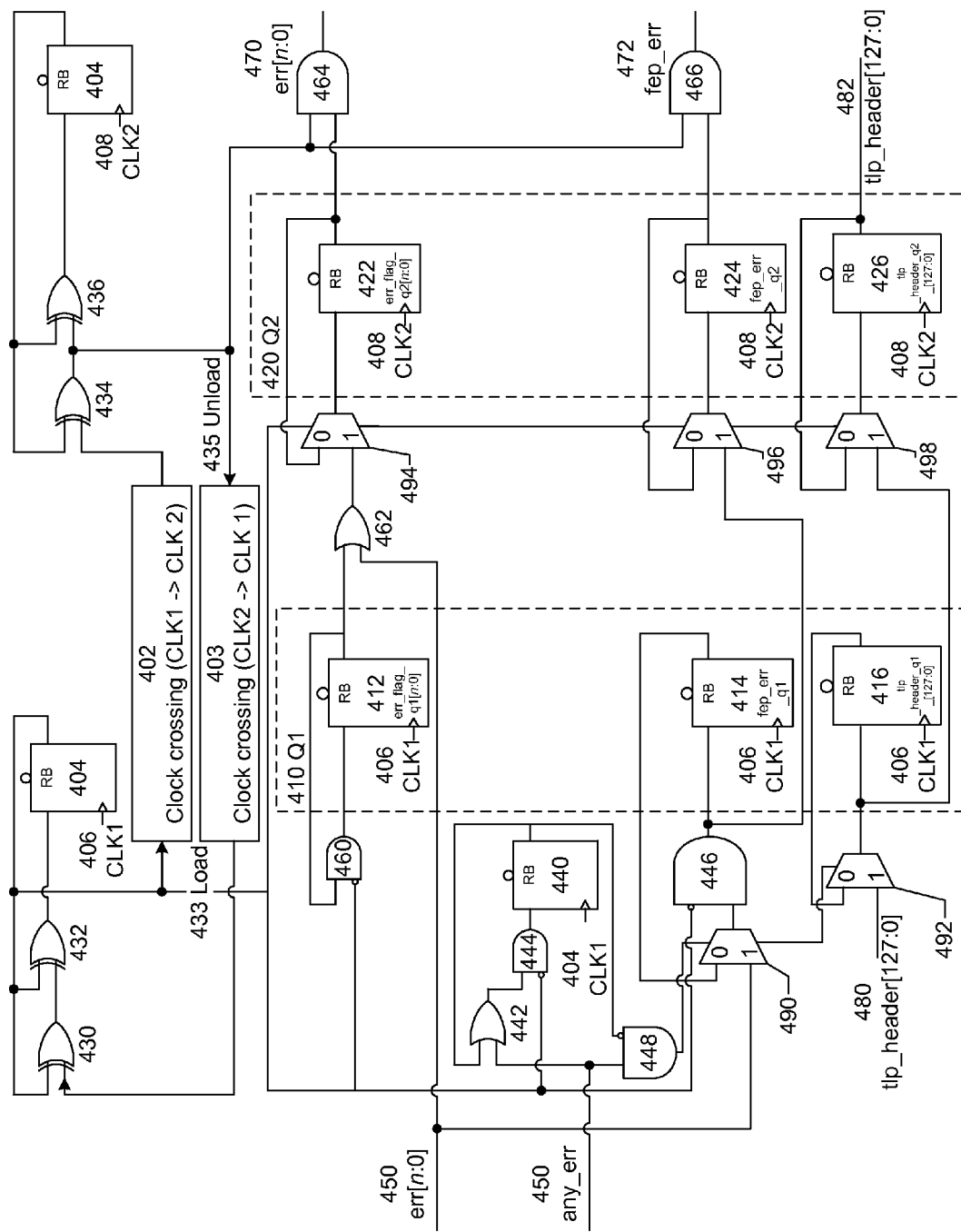
FIG. 4 illustrates the error handling logic in the I/O subsystem in accordance with one embodiment of the invention.

FIG. 4 illustrates an implementation of the error handling logic 400 in the I/O subsystem in accordance with one embodiment of the invention. For clarity of illustration, FIG. 4 is discussed with reference to 2. The signal any_err 450 indicates whether any uncorrectable errors have been detected by the TLP decode and error detector 230. The clock 1 (CLK1) 406 illustrates the source clock domain of the incoming TLPs 232 and the CLK2 408 illustrates the destination clock domain of the configuration register that supports AER in one embodiment of the invention.

The signals err[n:0] 450 indicate the errors that are detected and stored in one embodiment of the invention. The integer n illustrates the number of errors that can be detected and stored in one embodiment of the invention. The queue 1 410 has logic including, but not limited to, the flip-flops 412, 414 and 416 that are clocked by CLK1 406. The flip-flop 412 stores the error flag err_flag_q1[n:0] in one embodiment of the invention. The error flag err_flag_q1[n:0] indicates the type of the uncorrectable error detected in the TLP. The flip-flop 414 stores the FEP fep_err_q1 of the detected uncorrectable error and the flip-flop 416 stores the TLP header tlp_header_q1_[127:0] of the detected uncorrectable error in one embodiment of the invention.

The timing flow of the err_flag_q1[n:0], fep_err_q1 and the tlp_header_q1_[127:0] are illustrated by the uncorrectable error logged timing flow 324, the header of the first erroneous TLP timing flow 326 and the FEP corresponding to the first erroneous TLP timing flow 328 respectively.

The queue 2 420 has logic including, but not limited to, the flip-flops 422, 424 and 426 that are clocked by CLK2 408. The flip-flop 422 stores the error flag err_flag_q2[n:0] in one embodiment of the invention. The flip-flop 424 stores the FEP fep_err_q2 of the detected uncorrectable error and the flip-flop 426 stores the TLP header tlp_header_q2_[127:0] of the detected uncorrectable error in one embodiment of the invention.

The timing flow of the err_flag_q2[n:0], fep_err_q2 and the tlp_header_q2_[127:0] are illustrated by the uncorrectable error logged timing flow 332, the header of the first erroneous TLP timing flow 334 and the FEP corresponding to the first erroneous TLP timing flow 336 respectively.

The clock crossing 402 from CLK1 406 to CLK2 408 is initiated by the load signal 433. The load signal 433 is coupled to the multiplexers 494, 496, and 498 in one embodiment of the invention. The clock crossing 403 from CLK2 408 to CLK1 406 is initiated by the unload signal 435. The clock-crossed err[n:0] 470, fep_err 472 and the tlp_header[127:0] 482 are provided to the configuration register that supports the AER in one embodiment of the invention.

The workings of the error handling logic 400 are readily appreciated by one skilled in the relevant art and shall not be described herein. The error handling logic 400 illustrated in FIG. 4 is not meant to be limiting and other configurations of the error handling logic 400 can be used without affecting the workings of the invention.

Figure 5:
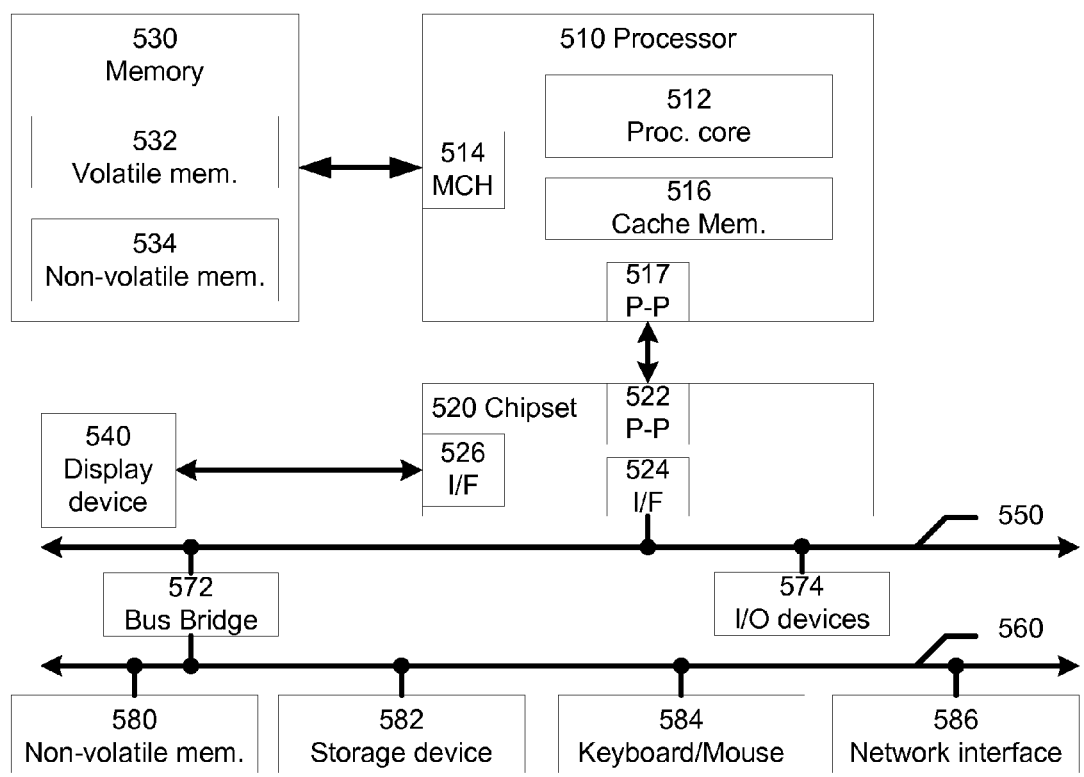
FIG. 5 illustrates a system to implement the methods disclosed herein in accordance with one embodiment of the invention.

FIG. 5 illustrates a system 500 to implement the methods disclosed herein in accordance with one embodiment of the invention. The system 500 includes, but is not limited to, a desktop computer, a laptop computer, a netbook, a tablet computer, a notebook computer, a personal digital assistant (PDA), a server, a workstation, a cellular telephone, a mobile computing device, an Internet appliance or any other type of computing device. In another embodiment, the system 500 used to implement the methods disclosed herein may be a system on a chip (SOC) system.

The processor 510 has a processing core 512 to execute instructions of the system 500. The processing core 512 includes, but is not limited to, pre-fetch logic to fetch instructions, decode logic to decode the instructions, execution logic to execute instructions and the like. The processor 510 has a cache memory 516 to cache instructions and/or data of the system 500. In another embodiment of the invention, the cache memory 516 includes, but is not limited to, level one, level two and level three, cache memory or any other configuration of the cache memory within the processor 510.

The memory control hub (MCH) 514 performs functions that enable the processor 510 to access and communicate with a memory 530 that includes a volatile memory 532 and/or a non-volatile memory 534. The volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 534 includes, but is not limited to, NAND flash memory, phase change memory (PCM), read only memory (ROM), electrically erasable programmable read only memory (EEPROM), or any other type of non-volatile memory device.

The memory 530 stores information and instructions to be executed by the processor 510. The memory 530 may also stores temporary variables or other intermediate information while the processor 510 is executing instructions. The chipset 520 connects with the processor 510 via Point-to-Point (PtP) interfaces 517 and 522. In another embodiment of the invention, the chipset 520 is a platform control hub. The I/O subsystem is part of the platform control hub in one embodiment of the invention.

The chipset 520 enables the processor 510 to connect to other modules in the system 500. In one embodiment of the invention, the interfaces 517 and 522 operate in accordance with a PtP communication protocol such as the Intel® QuickPath Interconnect (QPI) or the like. The chipset 520 connects to a display device 540 that includes, but is not limited to, liquid crystal display (LCD), cathode ray tube (CRT) display, or any other form of visual display device.

In addition, the chipset 520 connects to one or more buses 550 and 560 that interconnect the various modules 574, 580, 582, 584, and 586. Buses 550 and 560 may be interconnected together via a bus bridge 572 if there is a mismatch in bus speed or communication protocol. The chipset 520 couples with, but is not limited to, a non-volatile memory 580, a mass storage device(s) 582, a keyboard/mouse 584 and a network interface 586. The mass storage device 582 includes, but is not limited to, a solid state drive, a hard disk drive, an universal serial bus flash memory drive, or any other form of computer data storage medium. The network interface 586 is implemented using any type of well-known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 5 are depicted as separate blocks within the system 500, the functions performed by some of these blocks may be integrated within a single semiconductor circuit or may be implemented using two or more separate integrated circuits. For example, although the cache memory 516 is depicted as a separate block within the processor 510, the cache memory 516 can be incorporated into the processor core 512 respectively. The system 500 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
   logic to:
   store in a first queue, during a first time frame in a source clock domain, a header of a Transaction Layer Packet (TLP) and a First Error Pointer (FEP) associated with the TLP;
   copy to a second queue, during a second time frame in the source clock domain, the header of the TLP and the associated FEP; and
   clock cross, during the second time frame in the source clock domain, the header of the TLP and the associated FEP copied to the second queue, from the source clock domain to a destination clock domain.

2. The apparatus of claim 1, wherein the logic is further to:
   store in a register, during a time frame in the destination clock domain, the header of the TLP and the associated FEP copied in the second queue.

3. The apparatus of claim 2, wherein the logic is further to:
   store in the first queue, during the first time frame in the source clock domain, an indication of an error type associated with the TLP;
   copy to the second queue, during the second time frame in the source clock domain, the indication of the associated error type;
   clock cross, during the second time frame in the source clock domain, the indication of the associated error type copied to the second queue, from the source clock domain to the destination clock domain; and
   store in the register, during the time frame in the destination clock domain, the indication of the associated error type copied in the second queue.

4. The apparatus of claim 3, wherein the indication of the error type associated with the TLP comprises one of a data link protocol error status, a surprise down error status, a poisoned TLP status, a flow control protocol error status, a completion timeout status, a completer abort status, an unexpected completion status, a receiver overflow status, a malformed TLP status, an Extended Cyclic Redundancy Check (ECRC) error status, an unsupported request error status, an Access Control Services (ACS) violation status, an uncorrectable internal error status, a Multicast (MC) blocked TLP status, an Atomic Operations (AtomicOp) Egress blocked status, and a TLP prefix blocked error status.

5. The apparatus of claim 1, wherein the apparatus is compliant at least in part with a Peripheral Component Interface Express (PCIe) standard.

6. A system comprising:
   a processor;
   a memory; and
   an Input/Output (I/O) module coupled with the processor and the memory to:
   store in a first queue, during a first time frame in a source clock domain, a header of a Transaction Layer Packet (TLP) and a First Error Pointer (FEP) associated with the TLP;
   copy to a second queue, during a second time frame in the source clock domain, the header of the TLP and the associated FEP; and
   clock cross, during the second time frame in the source clock domain, the header of the TLP and the associated FEP copied to the second queue, from the source clock domain to a destination clock domain.

7. The system of claim 6, wherein the I/O module is further to: store in a register, during a time frame in the destination clock domain, the header of the TLP and the associated FEP copied in the second queue.

8. The system of claim 7, wherein the I/O module is further to:
   store in the first queue, during the first time frame in the source clock domain, an indication of an error type associated with the TLP;
   copy to the second queue, during the second time frame in the source clock domain, the indication of the associated error type;
   clock cross, during the second time frame in the source clock domain, the indication of the associated error type copied to the second queue, from the source clock domain to the destination clock domain; and store in the register, during the time frame in the destination clock domain, the indication of the associated error type copied in the second queue.

9. The system of claim 8, wherein the indication of the error type associated with the TLP comprises one of a data link protocol error status, a surprise down error status, a poisoned TLP status, a flow control protocol error status, a completion timeout status, a completer abort status, an unexpected completion status, a receiver overflow status, a malformed TLP status, an Extended Cyclic Redundancy Check (ECRC) error status, an unsupported request error status, an Access Control Services (ACS) violation status, an uncorrectable internal error status, a Multicast (MC) blocked TLP status, an Atomic Operations (AtomicOp) Egress blocked status, and a TLP prefix blocked error status.

10. The system of claim 1, wherein the system is compliant at least in part with a Peripheral Component Interface Express (PCIe) standard and wherein the I/O module is a Root Complex.

11. A method comprising:

storing in a first queue, during a first time frame in a source clock domain, a header of a Transaction Layer Packet (TLP) and a First Error Pointer (FEP) associated with the TLP;

copying to a second queue, during a second time frame in the source clock domain, the header of the TLP and the associated FEP; and clock crossing, during the second time frame in the source clock domain, the header of the TLP and the associated FEP copied to the second queue, from the source clock domain to a destination clock domain.

12. The method of claim 11, further comprising:

storing in a register, during a time frame in the destination clock domain, the header of the TLP and the associated FEP copied in the second queue.

13. The method of claim 12, further comprising:

storing in the first queue, during the first time frame in the source clock domain, an indication of an error type associated with the TLP;

copying to the second queue, during the second time frame in the source clock domain, the indication of the associated error type;

clock crossing, during the second time frame in the source clock domain, the indication of the associated error type copied to the second queue, from the source clock domain to the destination clock domain; and storing in the register, during the time frame in the destination clock domain, the indication of the associated error type copied to the second queue.

14. The method of claim 13, wherein the indication of the error type associated with the TLP comprises one of a data link protocol error status, a surprise down error status, a poisoned TLP status, a flow control protocol error status, a completion timeout status, a completer abort status, an unexpected completion status, a receiver overflow status, a malformed TLP status, an Extended Cyclic Redundancy Check (ECRC) error status, an unsupported request error status, an Access Control Services (ACS) violation status, an uncorrectable internal error status, a Multicast (MC) blocked TLP status, an Atomic Operations (AtomicOp) Egress blocked status, and a TLP prefix blocked error status.

* * * * *